United States Patent [19]

Bonnaud

[11] 3,957,312
[45] May 18, 1976

[54] VEHICLE SEAT HAVING A SWINGABLE BACKREST

[75] Inventor: Michel Bonnaud, Montbeliard, France

[73] Assignee: Automobiles Peugeot, Paris, France

[22] Filed: Feb. 3, 1975

[21] Appl. No.: 546,777

[30] Foreign Application Priority Data
Feb. 20, 1974 France .............................. 74.05755

[52] U.S. Cl. ............................... 297/341; 248/424; 297/366; 297/379
[51] Int. Cl.² ........................................... A47C 1/02
[58] Field of Search .................. 297/341, 366, 379; 248/429

[56] References Cited
UNITED STATES PATENTS

| | | | |
|---|---|---|---|
| 2,826,241 | 3/1958 | Himka | 297/341 |
| 2,942,646 | 6/1960 | Himka | 297/341 |
| 3,401,979 | 9/1968 | Putsch | 297/366 |
| 3,627,253 | 12/1971 | Hericourt et al. | 248/429 |
| 3,695,695 | 10/1972 | Colucci | 297/341 |
| 3,719,379 | 3/1973 | Sigmund | 297/379 |
| 3,774,964 | 11/1973 | Turner | 297/366 |
| 3,814,476 | 6/1974 | Abbott | 297/341 |

FOREIGN PATENTS OR APPLICATIONS

| | | | |
|---|---|---|---|
| 630,300 | 5/1936 | Germany | 297/341 |

*Primary Examiner*—James T. McCall
*Attorney, Agent, or Firm*—Burns, Doane, Swecker & Mathis

[57] ABSTRACT

The vehicle seat has a seat base and a backrest pivotable relative to the seat about an axis transverse to the direction in which the seat is longitudinally adjustable in position. A link pivoted at one end to the seat base front part and at the other end to the floor of the vehicle and a shoe connected to the seat base and adjustable in position on a slideway secured to the floor of the vehicle allow said longitudinal adjustment of the seat. The shoe is connected to the seat base by an intermediate member pivoted to the shoe and connected to the seat base to pivot about said axis. Locking and unlocking means releasably lock the intermediate member relative to the seat base.

4 Claims, 3 Drawing Figures

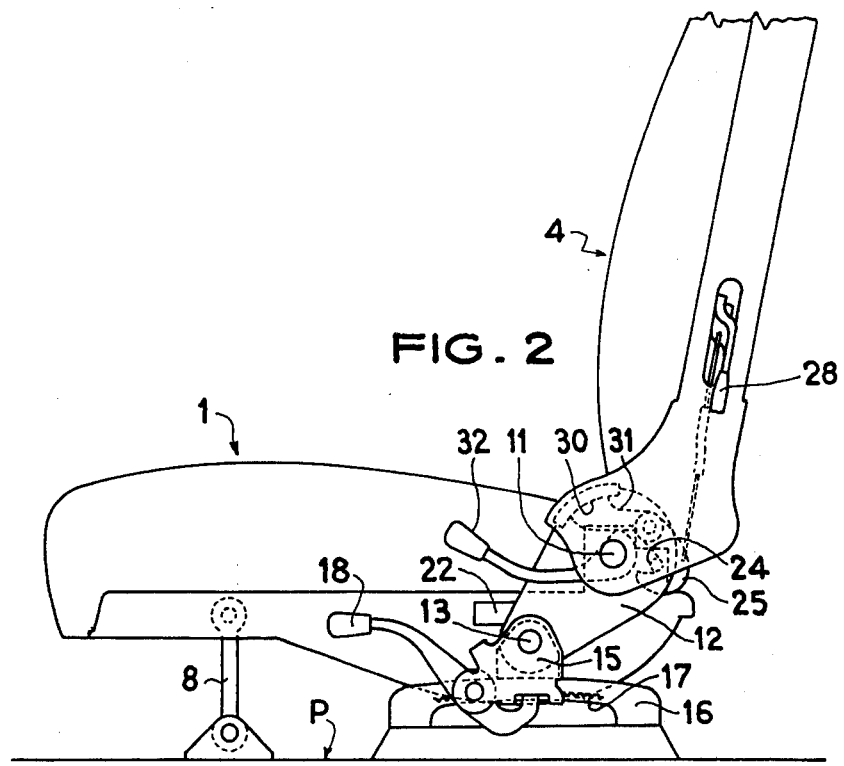
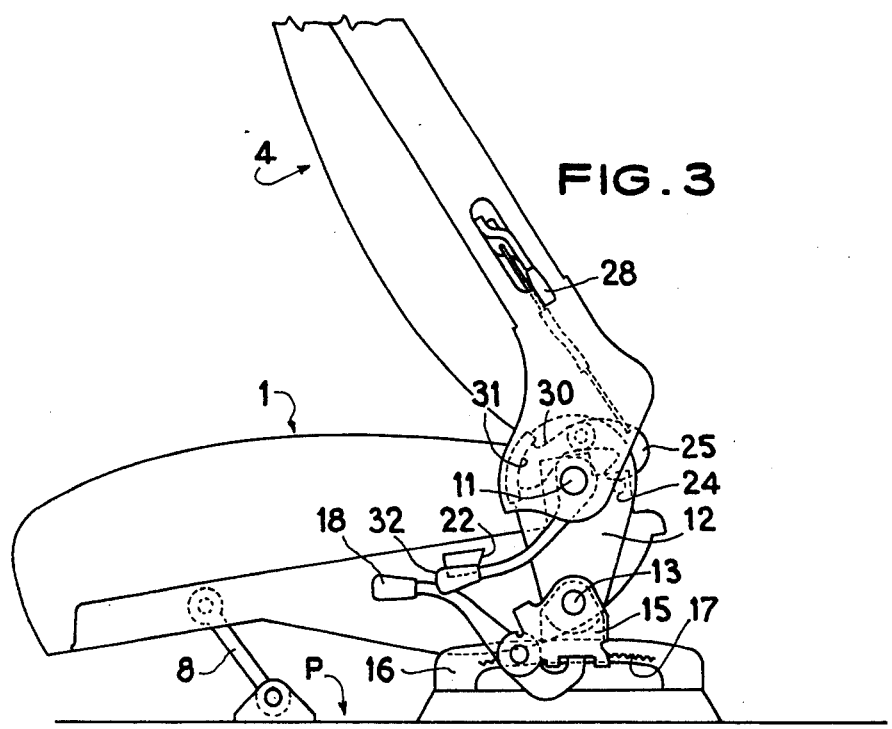

VEHICLE SEAT HAVING A SWINGABLE BACKREST

The present invention relates to vehicle seats and in particular seats for vehicles having two doors in which the front seats must have a swingable backrest so as to permit access to the rear seats of the vehicle.

Notwithstanding the swinging of the backrest, access to the rear seats is often inconvenient. Bearing in mind moreover that such seats must most often be adjustable in the longitudinal direction of the vehicle so as to be adaptable to users of different sizes, it could be possible to profit from this longitudinal adjustment possibility to facilitate access to the rear seat. In this case, the seat would be shifted forwardly before swinging over the backrest.

This arrangement however gives rise to certain problems: indeed, if the seat is occupied, its user may be in an uncomfortable position; on the other hand, if the seat is unoccupied, the operation is not very easy.

There is also known a rear vehicle seat which is adapted, on one hand, to permit a simultaneous adjustment in the longitudinal position of the seat base and of the inclination of the backrest and, on the other hand, to permit the swinging of the backrest forwardly and the withdrawal of the seat base under the backrest so as to constitute a planar loading surface. Such a seat however cannot be employed as a front seat, since the adjustments of the seat base and of the backrest are not independent and are necessarily of limited extent. Moreover, it does not solve in any way the problem of the maintenance of the inclination of the backrest after swinging over in the hypothesis that the backrest is adjustable.

An object of the present invention is to overcome the various drawbacks of the known devices and to provide a front seat for an automobile vehicle, and in particular a vehicle having two doors, which is longitudinally adjustable and which is arranged in such manner as to permit a particularly easy access to the rear seat. Further, when the backrest is adjustable in inclination, this inclination must be maintained after swinging the backrest over forwardly and returning it to its normal position of utilization.

The invention therefore relates to a seat having a seat base and a backrest, the seat base being adjustable with respect to the floor of the vehicle in a longitudinal direction whereas the backrest is swingable about a transverse axis with respect to said direction, the longitudinal adjustment mechanism comprising at least one link disposed between the front part of the seat base and the floor, at least one shoe slidable in a slideway disposed in the rear part of the seat and means for locking the shoe with respect to the slideway.

According to the invention, the backrest has at least one intermediate member mounted to pivot about two parallel transverse axes on one hand on the shoe and on the other hand on the base of the seat, there being provided locking and unlocking means for locking in a releasable manner this member with respect to the base.

With this arrangement, when the unlocking means has been actuated, the assembly comprising the backrest and the intermediate member can be swung over forwardly about the axis of pivoting to the shoe which simultaneously causes the displacement of the base forwardly by inclination of the or each link and by rotation about the axis of pivoting between the member and the base.

According to another feature of the invention, the backrest is pivoted to the intermediate member and means for locking and unlocking are provided to modify the angular position of the backrest with respect to the member.

Preferably, the aforementioned locking and unlocking means between the member and the seat base comprise two complementary abutment surfaces defining the swinging in the rearward direction of the member with respect to the base, and a locking mechanism which can be for example of the type comprising a withdrawable hook which is capable of engaging on a complementary male member.

A better understanding of the invention will be had from the ensuing description of a preferred embodiment of the invention with reference to the drawings in which:

FIGS. 2 and 3 are diagrammatic views showing the seat in two different positions of utilization.

Figure 1:
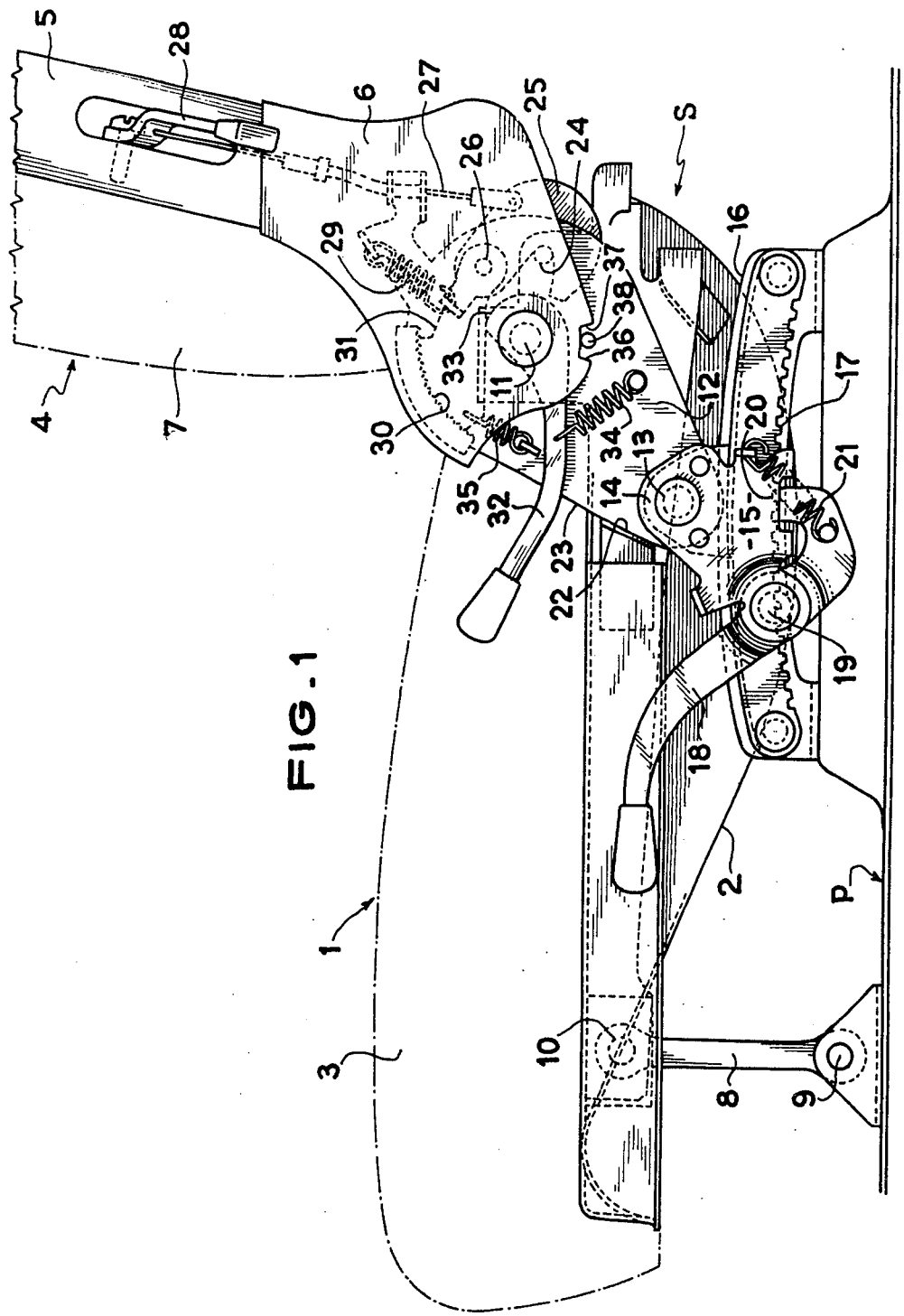
FIG. 1 is a side elevational view of a seat according to the invention.

There is shown in the drawing, and in particular in FIG. 1, a seat S according to the invention mounted on the floor P of a vehicle. This seat comprises a seat base 1 itself constituted by a frame or pan 2 on which a cushion 3 is secured. It comprises also a backrest 4 having a frame 5 terminating on each side of the seat in a side member 6 and to which is secured a cushion 7. The base of the seat is connected in its front part to the floor by a link 8 which is pivoted to the floor and to the pan by two parallel pivot pins 9, 10.

In its rear part, the frame of the base carries a pin 11 defining a first axis on which is journalled, on one hand, the side member 6 of the backrest and, on the other, a member 12. The latter carries at its lower end, with reference to the drawing, a pin 13 defining a second axis which is journalled in a bearing 14 defined by a shoe generally designated by the reference 15 and itself slidably mounted in the known manner in a slideway 16 integral with the floor of the vehicle. A locking mechanism, also known per se, is provided for locking the shoe in a given position with respect to the slideway. This mechanism comprises a rack 17 integral with the slideway and a lever 18 rotatably mounted to rotate about a pin 19 with respect to the shoe and provided with teeth 20 adapted to co-operate with the rack. A return spring 21 biases the lever 18 to its locking position.

As can be seen in FIG. 1, there is provided on the frame of the base 1 an abutment 22 which co-operates with a lateral surface 23 of the member or plate 12 to limit the swinging of the plate in the clockwise direction about the pin 13.

There is provided between the base 1 and this member a locking mechanism for preventing the forward swinging and constituted by a complementary member or lug 24 integral with the frame of the base and by a positive locking member or hook 25 which is mounted on the member to rotate about a pin 26 and which can be withdrawn from its locking position by a manual control means or cable mechanism 27 and a lever 28 in opposition to the action of a return spring 29.

The backrest is also pivoted by its side member 6 to the pin 11 and there is provided between the backrest and the intermediate member 12 a mechanism for modifying, within a certain range, the inclination of the backrest with respect to this member. This mechanism comprises a toothed sector 30 integral with the side member of the backrest and a pawl 31 carried by the member and movable about the pin 26. This pawl can be actuated by a lever 32 also mounted to be pivotable about the pin 11 and provided at its end with a cam 33 which, in the position of the lever shown in the drawing, maintains the pawl in engagement with the toothed sector. The control lever 32 is biased by a spring 34 to its locking position and another spring 35 biases the pawl to a withdrawn position corresponding to the unlocking. This adjusting mechanism is completed by means which limit the possible movements of the backrest with respect to the member 12, these means being constituted by two abutments 36, 37 formed on the member 6 and disposed on each side of a lug or pin 38 which is fixed with respect to the member.

A mechanism similar to that described hereinbefore can be provided in parallel on the opposite side of the seat. The actuating means, namely the levers 18, 28, 32, are however not repeated and rod or cable transmission means are then provided for actuating the corresponding movable means situated on the other side of the seat. The additional mechanism can also be somewhat simplified with respect to the complete device just described.

The operation and utilization of a seat such as that described may be clearly understood with reference to FIGS. 2 and 3. FIG. 2 corresponds to the position shown in FIG. 1, the different locking means being in their operative position, namely the toothed end of the lever 18 is engaged in the rack 17, the cam 33 bears against the adjacent surface of the pawl 31, and the hook 25 is engaged on the pin 24. The longitudinal position of the front seat having been chosen by the user, by acting on the lever 18 and a longitudinal displacement of the base 1 and the inclination of the backrest, by action on the lever 32, disengagement of the pawl 31 and correct orientation of the backrest with respect to the member 12, when it is desired to have access to the rear seats of the vehicle or to leave one of these rear seats, it is sufficient to actuate the lever 28 in the upward direction so as to disengage the hook 25 and release the assembly constituted by the backrest and the member 12. This assembly can then be swung forwardly by rotating about the pin 13 which results in the displacement of the pin 11 along an arc of a circle centered on the fixed pin 13. The base 1 then swings fowardly and occupies the position shown in FIG. 3.

In the course of this displacement, not only the backrest 4 swings over with respct to the base 1, the swinging of the seat results in the provision in its rear part of a large free space which corresponds to the desired result.

Note also that when the backrest is returned rearwardly, its resumes its initial position and is automatically locked by the engagement of the hook 25 on the stud 24.

The selected inclination of the backrest has moreover not been modified, since the member 12 resumes a given position with respect to the base 1, and the backrest and the member 12 remain together in the course of the front swinging and then the rearward swinging.

Having now described my invention what I claim as new and desired to secure by Letters Patent is:

1. In a vehicle seat comprising: a seat base, a backrest, means mounting the backrest relative to the seat base to be pivotable about a first axis, regulating means for regulating the position of the seat base relative to a floor in a direction longitudinally of the seat base, said first axis being transverse to said longitudinal direction, said regulating means including a link which is pivoted adjacent one end of the link to a front part of the seat base and pivoted adjacent an opposite end thereof to the floor, a slideway located in the rear part of the seat base for fixing to the floor and extending longitudinally of the seat base, a shoe slidable along the slideway, means for locking the shoe with respect to the slideway in a selected position, means for mounting the shoe on the seat base including an intermediate member mounted on the seat base to pivot about said first axis and mounted on the shoe to pivot about a second axis spaced from and paralel to said first axis, first locking and unlocking means for releasably locking the intermediate member relative to the seat base, said backrest being pivotally mounted with respect to said intermediate member, a second locking and unlocking means for adjusting the relative angular position between said backrest and said intermediate member.

2. A seat as claimed in claim 1, comprising means for limiting the movement of the backrest with respect to said intermediate member.

3. A seat as claimed in claim 1, wherein the first locking and unlocking means for said intermediate member comprises two complementary abutment surfaces respectively carried by the seat base and the intermediate member and limiting the swinging in one direction of said intermediate member with respect to the seat base and a positive locking member, a complementary member, a spring biasing the positive locking member to engage the complementary member and maintain said intermediate member in the opposite direction of swinging of said intermediate member with respect to the seat base, and manual control means for disengaging the positive locking member from the complementary member, the positive locking member being carried by one of two parts consisting of the seat base and the intermediate member and the complementary member being carried by the other of said two parts.

4. A seat as claimed in claim 3, wherein said second locking and unlocking means comprises a pawl mounted on the intermediate member to pivot about the same axis as said positive locking member.

* * * * *